United States Patent
Smith et al.

(10) Patent No.: US 10,974,822 B2
(45) Date of Patent: Apr. 13, 2021

(54) ANTI-TAIL BUFFET SYSTEM

(71) Applicant: Textron Innovations Inc., Providence, RI (US)

(72) Inventors: Michael Reaugh Smith, Colleyville, TX (US); Jouyoung Jason Choi, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 238 days.

(21) Appl. No.: 16/169,745

(22) Filed: Oct. 24, 2018

(65) Prior Publication Data

US 2020/0130819 A1 Apr. 30, 2020

(51) Int. Cl.
*B64C 27/00* (2006.01)
*F16F 7/10* (2006.01)

(52) U.S. Cl.
CPC .......... *B64C 27/001* (2013.01); *F16F 7/1022* (2013.01); *B64C 2027/005* (2013.01); *F16F 2222/08* (2013.01)

(58) Field of Classification Search
CPC ........ B64C 2027/004; B64C 2027/005; B64C 27/001; B64C 11/30
See application file for complete search history.

(56) References Cited

U.S. PATENT DOCUMENTS

| | | | |
|---|---|---|---|
| 989,958 A | 4/1911 | Frahm | |
| 3,322,379 A | 5/1967 | Flannelly | |
| 5,788,029 A * | 8/1998 | Smith | F16F 7/1005 188/267 |
| 6,067,853 A * | 5/2000 | Thevenot | B64C 27/001 73/178 H |
| 8,920,125 B2 * | 12/2014 | Welsh | B64C 27/001 416/145 |
| 2006/0255206 A1* | 11/2006 | Jolly | F16F 7/1011 244/76 R |
| 2008/0093499 A1* | 4/2008 | Bietenhader | B64C 27/001 244/17.11 |
| 2009/0236468 A1* | 9/2009 | Welsh | H02K 7/14 244/17.13 |

(Continued)

OTHER PUBLICATIONS

Malone, Pat, "Flight test: Bell 505 Jet Rangerx," https://www.pressreader.com/uk/pilot/20180701/283343292931190, Jul. 1, 2018, 9 pages.

*Primary Examiner* — Philip J Bonzell
*Assistant Examiner* — Tye William Abell
(74) *Attorney, Agent, or Firm* — Whitaker Chalk Swindle & Schwartz PLLC; Enrique Sanchez, Jr.

(57) ABSTRACT

An anti-tail buffet device leverages existing rotorcraft components to attenuate a tailboom's lateral "ringing" from air buffeting. Anti-buffet masses are tuned to the tailboom's lateral-bending or torsional natural frequency such that when lateral motion occurs, the response at this frequency is cancelled by the anti-buffet system, preventing this vibration from entering into the tailboom structure. Motion stops prevent over-travel. The mass of the tail rotor actuator is soft-mounted, such that its natural frequency is equal to the tailboom's lateral-bending or torsional natural frequency. When lateral loading occurs on the tail rotor disk, the lateral response at this frequency is attenuated by the soft-mounted tail rotor actuator, thereby preventing the vibration in the tailboom structure.

18 Claims, 4 Drawing Sheets

(56) References Cited

U.S. PATENT DOCUMENTS

2016/0144955 A1\* 5/2016 Certain ................... B64C 27/82
                                                    416/147
2019/0106203 A1\* 4/2019 Bennett ................. B64D 27/26

\* cited by examiner

ANTI-TAIL BUFFET SYSTEM

BACKGROUND

1. Field of the Invention

The present invention is generally related to systems used to mitigate vibration in a dynamic environment, and more specifically, to vibration mitigating systems mounted to an aircraft tailboom.

2. Background of the Invention

An aircraft can generate "dirty," non-harmonic, non-laminar air via aircraft components such as rotor blades, propellers, or engines. As the airflow is taken into these components, it is expelled with an irregular motion resulting from eddies and unsteady currents generated by the components. This irregular airflow impinges upon the tailboom causing it to respond at its natural frequency ($\omega_{TB}$). In forward flight, turbulent air with broadband energy impinges on the empennage, causing an aircraft's tailboom to "ring" at its lateral-bending natural frequency, which is typically 5-9 Hz, or torsional natural frequency, which typically occurs 10-20 Hz. This tailboom response can cause annoyance to the aircraft passengers and be substantial enough to cause anxiety. Although this phenomenon is common to all aircraft, rotorcraft are particularly susceptible to it due to the generation of unsteady airflow by the rotor system components and their position upstream from the tailboom.

Previous attempts to remedy this unwanted phenomenon include the use of airflow entrainment devices, which endeavor to keep the airflow attached, or if flow separation occurs, redirect it away from empennage control surfaces.

Other approaches have included attempts at absorbing the vibrations, such as U.S. Pat. No. 989,958, entitled "Device for Damping Vibrations of Bodies" issued on Apr. 18, 1911. However, these approaches result in excessive weight and shift the center of gravity (CG) too far aft.

SUMMARY

The present disclosure leverages existing rotorcraft components by utilizes the highly effective aerodynamic tail rotor disk to attenuate the tailboom's lateral "ringing" from air buffeting. The tail rotor disk is the disk encircled by the rotating tail rotor blades and is an effective aerodynamic "lifting" device. A tail rotor actuator is used to change the pitch, that is, the angle of attack of each tail rotor blade. The tail rotor actuator is attached to a tail rotor control tube, which is in turn connected to pitch links, which are attached to the tail rotor blade pitch horns. In the present disclosure, the mass of tail rotor actuator is soft mounted such that its natural frequency is equal to the tailboom's lateral-bending or torsional natural frequency, $\omega_{TB}$. When broadband oscillatory (unsteady) aerodynamic lateral loading occurs on the tail rotor disk, the spectrum of the excitation frequency is "notched" such that the $\omega_{TB}$ frequency is not transmitted through the tail rotor disk preventing introduction of this aerodynamically induced vibration into the tailboom structure. This "notch" effect occurs because the harmonic force required to excite a system in resonance approaches zero and corollarily the harmonic force transmitted to a system in resonance approaches zero. Advantageously, the vibration frequency of the mass can be tuned to a predetermined frequency by varying the weight of the mass attached to the tail rotor actuator. The tail rotor actuator could be a hydraulic actuator, electromechanical actuator, a mechanical bell-crank, or other device. The total apparent mass of the tail rotor actuator includes the inertial component due to tail rotor blade pitch and corresponding movement of the actuation mechanism. Motion stops on the tail rotor actuator prevent over-travel.

Accordingly, one embodiment of the present disclosure comprises a flexible elastic member disposed between a bolt and an actuator. The elastic member can include homogeneous elastomers such as rubber, synthetic rubber, or other flexible synthetic or natural materials, disposed between an inner metal ring and an outer metal ring. Alternatively, the elastic member can be laminated with interspersed shims.

In another embodiment of the disclosure, an anti-tail buffet system can include a mass coupled to a tail rotor blade pitch change mechanism; and an elastic member that operably couples the mass to an airframe structure, the mass being attached to the tail rotor blade pitch change mechanism, wherein the elastic member deforms to allow the mass to vibrate at a predetermined frequency sufficient to cancel the oscillatory response of the airframe structure. The predetermined frequency of the mass can be tuned by varying the weight of the mass. The elastic member can also include an annular elastomer disposed between an outer metal ring and an inner metal ring. The airframe structure can be a tailboom or a tail fin. The securing device can include a nut and bolt and the mass can be an actuator, a bell-crank, a weight, or other suitable mass.

In yet another embodiment of the disclosure, an anti-tail buffet system can include an airframe structure having a lateral-bending natural frequency; a mass attached to a tail rotor blade pitch change mechanism; an elastic member disposed within the mass; and a securing device configured to operably couple the elastic member to a ferrule disposed proximate to the structure, wherein the elastic member deforms to allow the mass to vibrate at a predetermined frequency sufficient to cancel the oscillatory response of the structure; a mass having a mass opening; an elastic member having a member opening, the elastic member disposed within the mass opening; a securing device configured to operably couple the elastic member to a ferrule disposed proximate to the structure, wherein the elastic member deforms to allow the mass to vibrate at the lateral-bending natural frequency of the structure to cancel the airframe structure's lateral-bending oscillatory response. The predetermined frequency of the mass can be tuned by varying the weight of the mass.

The mass can be positioned a first distance from the ferrule to allow unobstructed vibration of the mass toward the structure. The elastic member can include an annular elastomer disposed between an outer metal ring and an inner metal ring. The annular elastomer can be made of rubber. The airframe structure can be a tailboom or a tail fin. The securing device can also include a nut and bolt. The mass can be an actuator, a bell-crank, a weight, or other suitable mass. Additionally, a motion stop cap can be disposed over a first end of the securing device and positioned a second distance from the securing device to limit the movement of the mass toward the structure. The ferrule can be secured to the structure with a nut. The elastic member can be secured within the mass opening with a spanner nut.

Other advantages will be apparent to those of ordinary skill in the art.

DETAILED DESCRIPTION

The preferred versions of the inventions presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
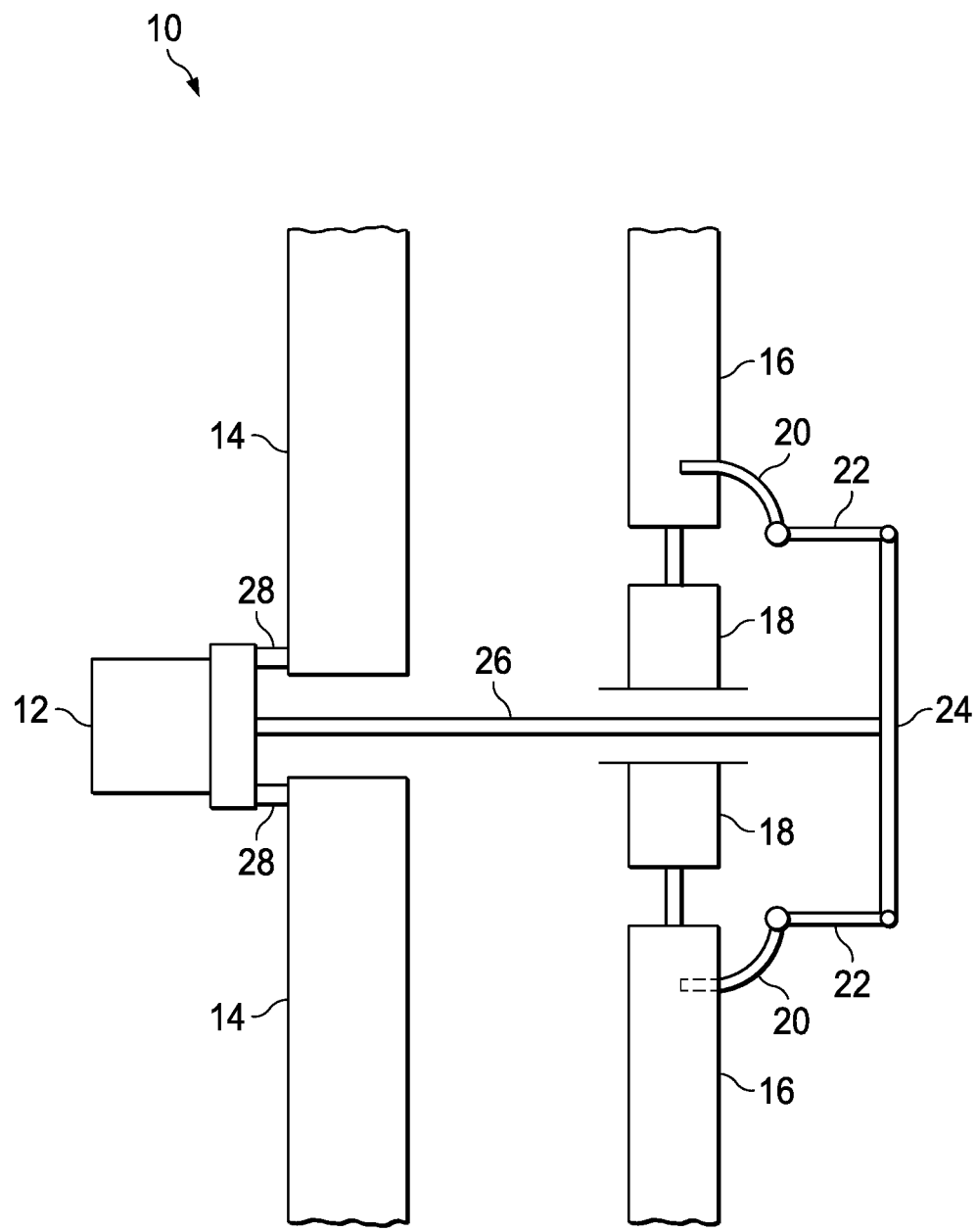
FIG. 1 is a schematic view of an embodiment of the anti-tail buffet system, in accordance with the present disclosure.

FIG. 1 is a schematic view of an embodiment of the anti-tail buffet system, designated generally as 10, in accordance with the present disclosure. The system 10, can include a tail rotor control actuator 12, a tail fin (tailboom) 14, a tail rotor blade 16, a tail rotor hub 18, a tail rotor blade pitch horn 20, a tail rotor pitch link 22, a tail rotor control cross-head 24, a tail rotor control tube 26, and a tail rotor control elastic mount 28. The tail rotor blade 16, the tail rotor hub 18, the tail rotor blade pitch horn 20, the tail rotor pitch link 22, the tail rotor control cross-head 24, and the tail rotor control tube 26 can be collectively referred to herein as a tail rotor blade pitch change mechanism.

The tail rotor control actuator 12 controls the pitch of the tail rotor blades 16 by extending and retracting the tail rotor control tube 26. The tail rotor control tube 26 can be operably coupled to the tail rotor control cross-head 24 through the tail fin (tailboom) 14. The cross-head 24 is operably coupled to the tail rotor pitch link 22, which is operably coupled to the tail rotor blade pitch horn 20, which is operably coupled to the tail rotor blades 16, which are operably coupled to the tail rotor hub 18. When the actuator 12 is extended, the pitch of the tail rotor blades 16 is altered via the cross-head 24, pitch link 22, and pitch horn 20 mechanism. Advantageously, the actuator 12 is operably coupled to the tail fin (tailboom) 14 via the tail rotor control elastic mount 28.

The tail rotor control elastic mount 28 includes an elastic member that can deform to allow the actuator 12 to vibrate at a particular frequency. The system 10 can effectively provide a spring-mass system to prevent introduction of unsteady aerodynamic forces at the particular frequency to be transmitted through the tail rotor blades and into the structure. The tail rotor control actuator 12 can be selected to have a predetermined weight such that it is tuned to the tailboom's lateral-bending, or torsional natural frequency ($\omega_{TB}$), both natural modes having significant lateral motion in their respective eigenvector shape. As the tailboom begins to move laterally due to unsteady airflow impinging upon the tail rotor blades, the frequency of such lateral motion can be mitigated or cancelled by the anti-tail buffet system.

The stiffness and mass necessary to tune to the particular natural frequency such that it coalesces with the tailboom's lateral-bending or torsional natural frequency are determined as follows. As is well understood in the art, the natural frequency ($\omega_{TB}$) is equal to the square root of the stiffness (k) divided by the apparent mass ($m_a$). Formulaically, $$\omega_{TB} = \sqrt{\frac{k}{m_a}}.$$

Accordingly, if the frequency and stiffness is known, then the mass can be calculated. The apparent mass ($m_a$) is rectilinear sum of the mass (m) of the actuator, the mass of the tail rotor control tube 26, the mass of tail rotor control cross-head 24, the inertial component of the cumulative tail rotor blade pitch horns 20, and the inertial component due to the pitch of the cumulative tail rotor blades 16. If the actuator mass is insufficient to tune the system 10, additional weight (mass) can be added to the actuator 12 to tune the actuator's 12 natural frequency to match the tailboom's 14 lateral-bending or torsional natural frequency ($\omega_{TB}$). The additional mass can be secured to the actuator 12 such that it will maintain its position during operation of the aircraft. The tail rotor control elastic mount (elastomer member) 28 allows the mass of the actuator to be in resonance with the tailboom's 14 lateral-bending or torsional natural frequency ($\omega_{TB}$) and thereby nullify the introduction of the lateral component of the oscillatory (unsteady) aerodynamic loading through the tail rotor blades and thus cancel or otherwise attenuate the introduction of vibration into the tailboom 14. In this way, the mass-spring system can be characterized and tuned.

Figure 2A:
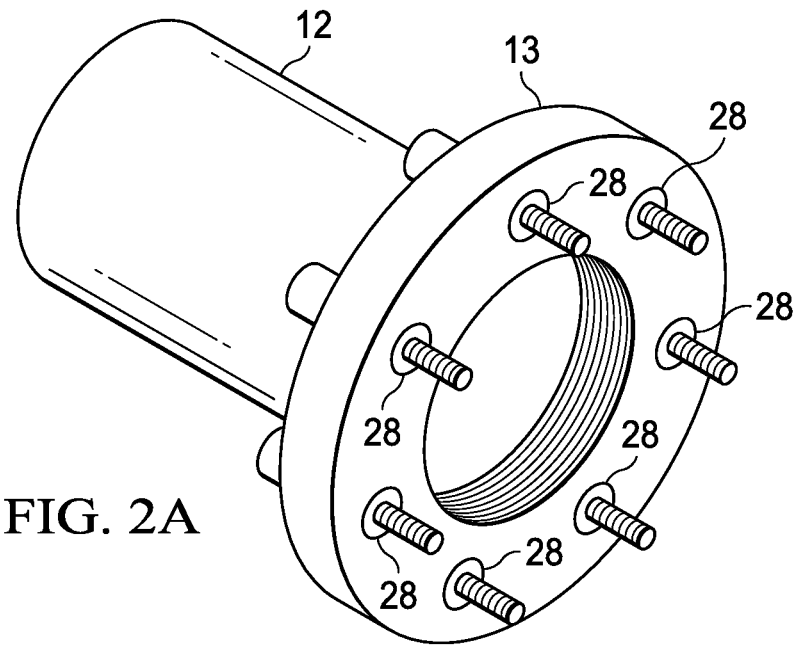
FIG. 2A is a perspective view of a tail rotor control actuator implementing aspects of the anti-tail buffet system, in accordance with the present disclosure.
Figure 2B:
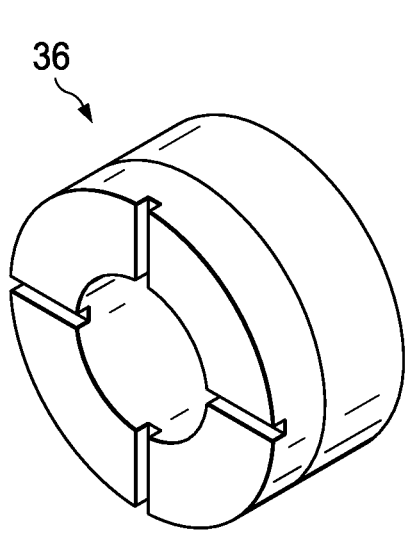
FIG. 2B is a perspective view of a spanner nut, in accordance with the present disclosure.
Figure 2C:
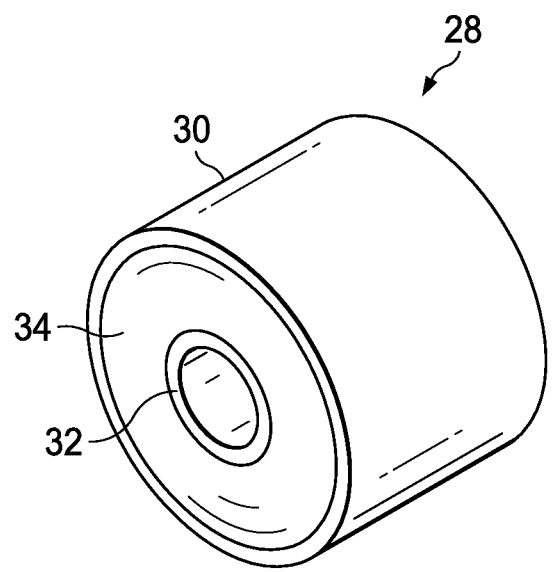
FIG. 2C is a perspective view of a tail rotor control elastic mount (elastic member), in accordance with the present disclosure.

Referring to FIGS. 2A-2C, FIG. 2A is a perspective view of a tail rotor control actuator, designated as 12, implementing aspects of the anti-tail buffet system, in accordance with the present disclosure. FIG. 2B is a perspective view of a spanner nut, designated as 36, in accordance with the present disclosure. FIG. 2C is a perspective view of a tail rotor control elastic mount (elastomer member), designated as 28, in accordance with the present disclosure. The tail rotor control actuator 12 extends and retracts the tail rotor control tube 26. The rotor control tube 26 causes the tail rotor pitch link 22 to move "up" or "down," so that it moves the pitch angle of the tail rotor blade 16.

The tail rotor control actuator 12 can include a flange that allows the actuator 12 to be operably coupled to an airframe structure, such as a tail fin or tailboom 14. The flange of the actuator 12 can include one or more mass openings that allow the actuator (mass) 12 to be coupled to the airframe structure with a securing device, such as a bolt, or other suitable securing device. An elastomer member 28 can include an annular elastomer 34 disposed between an outer metal ring 30 and an inner metal ring 32. The annular elastomer 34 can be made of rubber, or other suitable material.

An elastic member 28 can be disposed within the mass opening. The mass opening in the flange can have a lip at a first end of the flange, such that the elastomer member 28 can fit within the mass opening, with the outer metal ring 30 engaging the lip without passing therethrough. A spanner nut 36, or other suitable retention mechanism, such as a weld, can be operably coupled to a second end of the flange to secure the elastomer member 28 in place. The spanner nut can engage the outer metal ring 30, such the outer metal ring 30 is secured between the flange lip and the spanner nut. The securing device can be disposed through the member opening and configured to operably couple the mass to an airframe structure by securably engaging the inner metal ring 32. With the inner metal ring 32 secured in place between the securing device and the airframe member, and the outer metal ring secured in place between the spanner nut 36 and the flange lip, the elastomer 34 is free to deform such that the actuator can move along an axis (lateral) perpendicular to the airframe member. The elastomer member 28 can therefore deform to allow the actuator (mass) 12 to vibrate at a natural frequency equal to the lateral-bending or torsional natural frequency of the airframe structure to prevent introduction of unsteady aerodynamic forces at this frequency through the tail rotor blades into the airframe structure.

Figure 3:
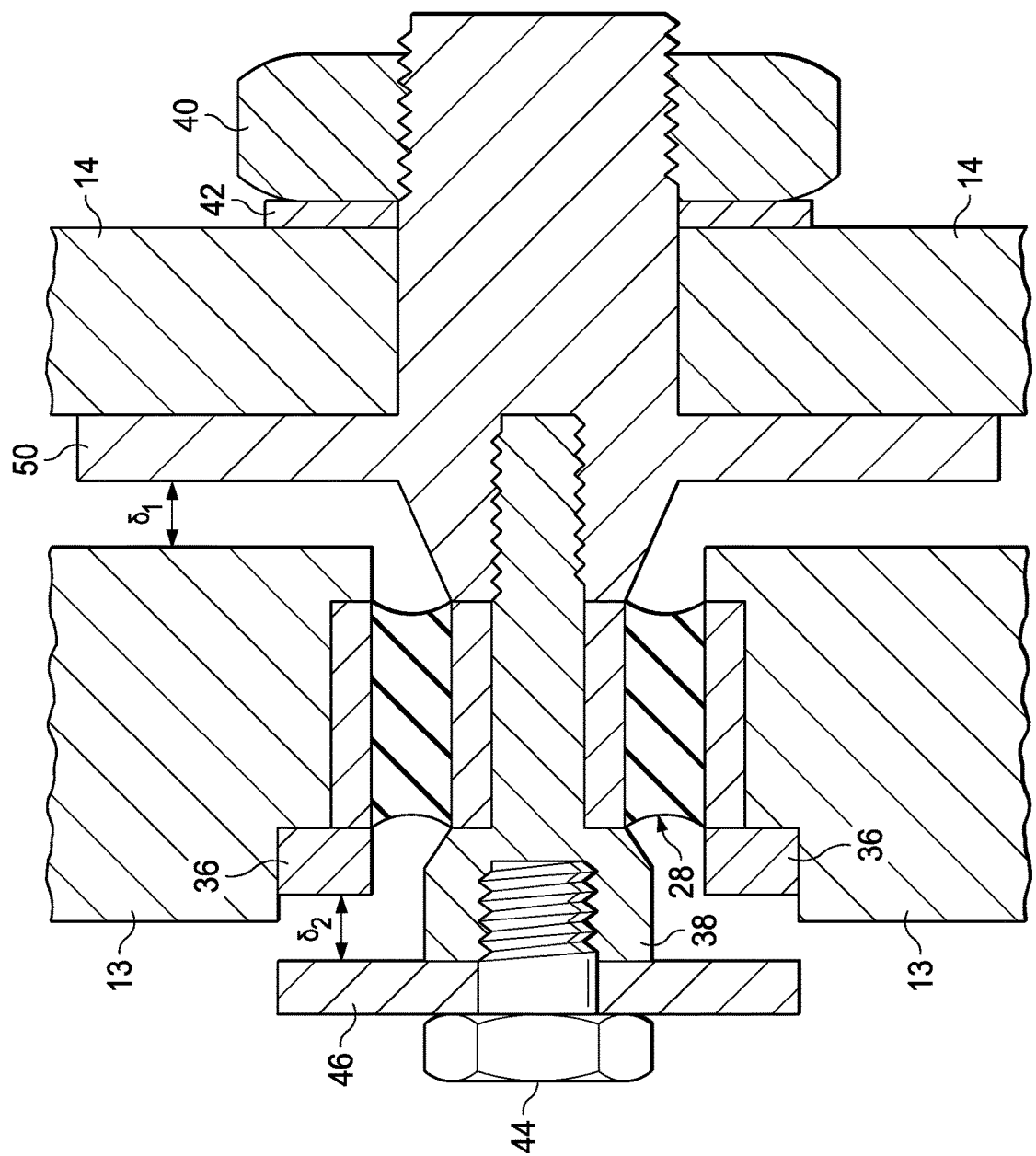
FIG. 3 is a cross-sectional view of a portion of an embodiment of the anti-tail buffet system, in accordance with the present disclosure.

FIG. 3 is a cross-sectional view of a portion of an embodiment of the anti-tail buffet system, in accordance with the present disclosure. The system includes an actuator having an actuator flange 13 having one or more mass openings, an airframe structure 14 having a lateral-bending natural frequency, an elastomer member having a member opening, and a securing device configured to operably couple the elastomer member to a ferrule disposed proximate to the air frame structure 14.

As above, the elastomer member 28 can be disposed within the mass opening. The mass opening in the actuator flange can have a lip at a first end of the flange, such that the elastomer member 28 can fit within the mass opening, with the outer metal ring 30 engaging the lip without passing therethrough. The spanner nut 36, or other suitable retention mechanism, such as a weld, can be operably coupled to a second end of the flange to secure the elastomer member 28 in place. The spanner nut can engage the outer metal ring 30, such the outer metal ring 30 is secured between the flange lip and the spanner nut. The securing device can be disposed through the member opening and configured to operably couple the mass to an airframe structure by securably engaging the inner metal ring 32. With the inner metal ring 32 secured in place between the securing device and the airframe member, and the outer metal ring secured in place between the spanner nut 36 and the flange lip, the elastomer 34 is free to deform such that the actuator can move along an axis (lateral) perpendicular to the airframe member. The elastomer member 28 can therefore deform to allow the actuator (mass) 12 to move at a natural frequency equal to the lateral-bending or torsional natural frequency of the airframe structure to prevent introduction of unsteady aerodynamic forces at this frequency through the tail rotor blades into the airframe structure. Advantageously, the vibration frequency of the mass can be tuned to a predetermined frequency by varying the weight of the mass. The mass can be positioned a first distance ($\delta_1$) from the ferrule to allow unobstructed movement of the mass toward the airframe structure.

An elastomer bolt 28 can include a male end having threads to securably mate with a ferrule, nut, or other suitable component. The elastomer bolt 38 can also include a female end, optionally having threads, to securably mate with a stop plate bolt 44. A stop plate 46 is preferably disposed between the head of the stop plate bolt 44 and the head of the elastomer bolt 38. The stop plate 46 can be positioned a second distance ($\delta_2$) from the spanner nuts 36, to prevent over-travel of the actuator away from the airframe structure 14. The elastomer bolt 38 can be disposed through the member opening and operably coupled to a ferrule 50. The ferrule 50 can have a female end, having a ferrule flange to securably mate with the male end of the elastomer bolt 38. The ferrule 50 can have a male end disposed through airframe structure 14 to securably mate with a nut 40, rivet, or other suitable component. A washer 42 can be disposed between the airframe structure 14 and the nut 40. The female end of the ferrule 50 preferably protrudes from the flange of ferrule 50 such that it only contacts the inner metal ring of the elastomer member 28. The actuator flange 13 is spaced a first distance ($\delta_1$) from the flange of ferrule 50.

Figure 4:
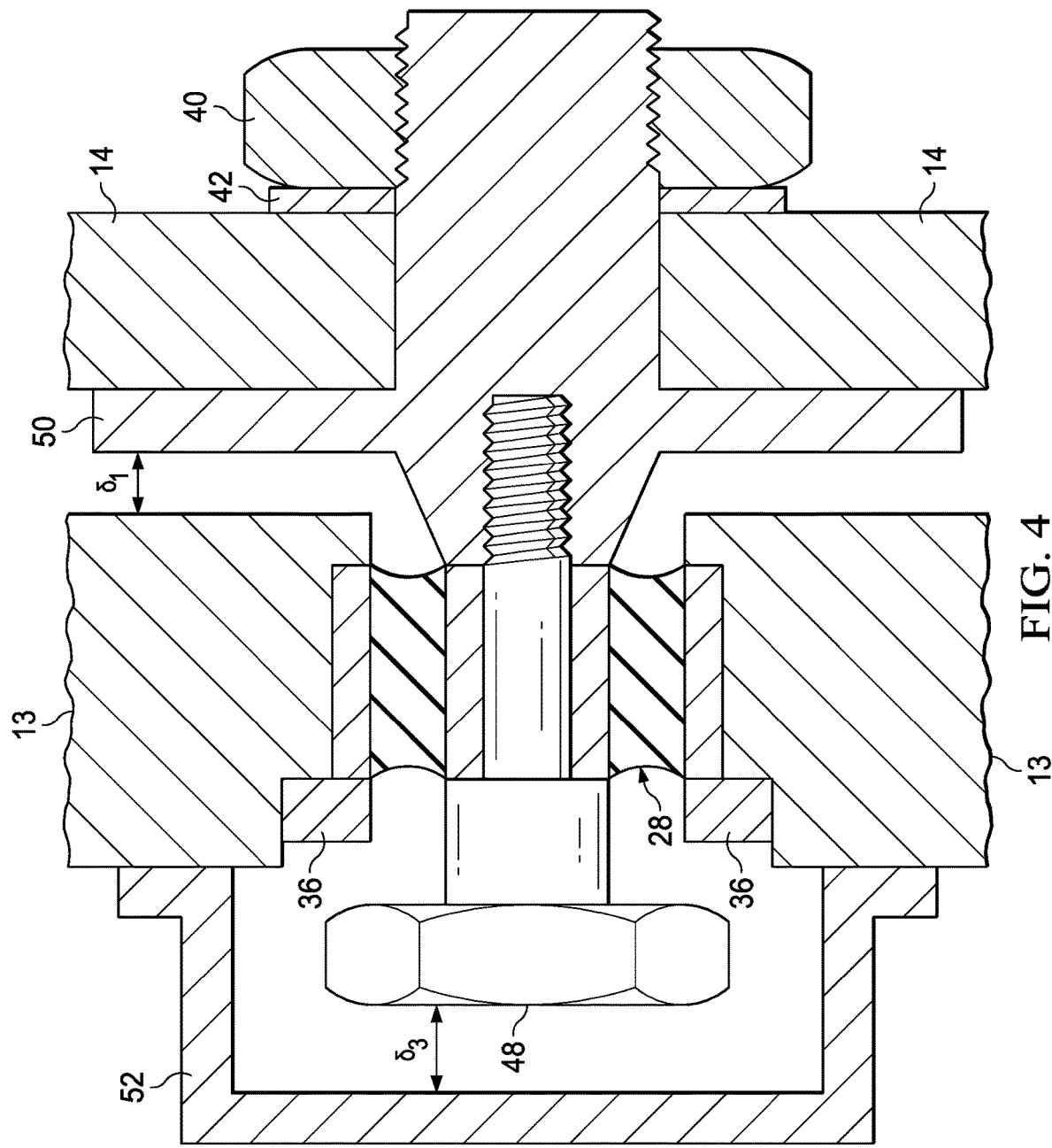
FIG. 4 is a cross-sectional view of a portion of another embodiment of the anti-tail buffet system, in accordance with the present disclosure.

FIG. 4 is a cross-sectional view of a portion of another embodiment of the anti-tail buffet system, in accordance with the present disclosure. The embodiment of FIG. 4 replaces the stop plate 46, stop plate bolt 44, and elastomer bolt 38 embodiment of FIG. 3 with a male only elastomer bolt 48 and a motion stop cap 52. The motion stop cap 52 can be disposed over the head of elastomer bolt 48 and positioned a third distance ($\delta_3$) from the head of the elastomer bolt 48, such that $\delta_3$ is equal or less than $\delta_1$ to prevent over-travel, or otherwise limit the movement of the of the actuator toward the airframe structure 14. The third distance ($\delta_3$) may be less than first distance ($\delta_1$) to prevent the flange of ferrule 50 from contacting the actuator flange 13. The ferrule 50 can be secured to the airframe structure with a nut 40.

The present invention achieves at least the following advantages:

1. tuned cancelation of the tail rotor "disk's" ability to introduce vibratory excitation of the tailboom at its lateral-bending or torsional natural frequency;
2. usage of preexisting aircraft components (e.g., tail rotor) to minimize the parasitic effects of weight on an aircraft;
3. implementation of relatively cheap and lightweight elastomer mounts to achieve the requisite mass tuning and movement; and
4. push-pull tail rotor commands at frequencies below or above $\omega_{TB}$ are not affected by anti-buffet masses due to the motion stops. Vibratory motion is small compared with tail rotor commands.

While the inventions disclosed have been shown in particular forms, they are not thus limited and susceptible to various changes and modifications without departing from the spirit thereof. Persons skilled in the art will understand that these concepts are susceptible to various changes and modifications, and may be implemented or adapted readily to other types of environments. Further, the individual elements of the claims are not well-understood, routine, or conventional. Instead, the claims are directed to the unconventional inventive concepts described in the specification.

What is claimed is:

1. An anti-tail buffet system, comprising:
   a mass coupled to a tail rotor blade pitch change mechanism; and
   an elastic member that operably couples the mass to an airframe structure,
   wherein the elastic member deforms to allow the mass to vibrate at a predetermined frequency sufficient to cancel an oscillatory response of a tailboom of the airframe structure caused by airflow.

2. The anti-tail buffet device of claim 1, wherein the predetermined frequency of the mass can be tuned by varying the weight of the mass.

3. The anti-tail buffet device of claim 1, wherein the airframe structure is a tailboom.

4. The anti-tail buffet device of claim 1, wherein the airframe structure is a tail fin.

5. The anti-tail buffet device of claim 1, wherein the mass is an actuator.

6. The anti-tail buffet device of claim 1, wherein the elastic member includes an annular elastomer disposed between an outer metal ring and an inner metal ring.

7. The anti-tail buffet device of claim 6, wherein the annular elastomer is made of rubber.

8. An anti-tail buffet system, comprising:
an airframe structure having a natural frequency;
a mass attached to a tail rotor blade pitch change mechanism;
an elastic member disposed within the mass; and
a securing device configured to operably couple the elastic member to a ferrule disposed proximate to the airframe structure,
wherein the elastic member deforms to allow the mass to vibrate at a predetermined frequency sufficient to cancel an oscillatory response of a tailboom of the airframe structure caused by airflow.

9. The anti-tail buffet system of claim 8, wherein the predetermined frequency of the mass can be tuned by varying the weight of the mass.

10. The anti-tail buffet system of claim 8, wherein the mass is positioned a first distance from the ferrule to allow unobstructed movement of the mass toward the structure.

11. The anti-tail buffet system of claim 8, wherein the airframe structure is a tailboom.

12. The anti-tail buffet system of claim 8, wherein the airframe structure is a tail fin.

13. The anti-tail buffet system of claim 8, wherein the mass is an actuator.

14. The anti-tail buffet system of claim 8, further comprising a motion stop cap disposed over a first end of the securing device and positioned a second distance from the securing device to limit the movement of the mass toward the structure.

15. The anti-tail buffet system of claim 8, wherein the ferrule is secured to the structure with a nut.

16. The anti-tail buffet system of claim 8, wherein the elastomer member is secured within the mass opening with a spanner nut.

17. The anti-tail buffet system of claim 8, wherein the elastic member includes an annular elastomer disposed between an outer metal ring and an inner metal ring.

18. The anti-tail buffet system of claim 17, wherein the annular elastomer is made of rubber.

* * * * *